(12) United States Patent
Vrame et al.

(10) Patent No.: US 11,876,360 B2
(45) Date of Patent: Jan. 16, 2024

(54) CONDUIT COUPLING ASSEMBLY

(71) Applicant: S-P Products, Inc., Elk Grove Village, IL (US)

(72) Inventors: Peter A. Vrame, Wood Dale, IL (US); Mikel Bishka, Glendale Heights, IL (US)

(73) Assignee: S-P Products Inc., Elk Grove Village, IL (US)

( * ) Notice: Subject to any disclaimer, the term of this patent is extended or adjusted under 35 U.S.C. 154(b) by 983 days.

(21) Appl. No.: 16/813,200

(22) Filed: Mar. 9, 2020

(65) Prior Publication Data
US 2020/0287366 A1    Sep. 10, 2020

Related U.S. Application Data

(60) Provisional application No. 62/815,680, filed on Mar. 8, 2019.

(51) Int. Cl.
| | |
|---|---|
| *H02G 3/06* | (2006.01) |
| *H02G 3/22* | (2006.01) |
| *H02G 1/00* | (2006.01) |
| *H02G 1/12* | (2006.01) |
| *H02G 1/14* | (2006.01) |

(52) U.S. Cl.
CPC .......... *H02G 3/0616* (2013.01); *H02G 1/005* (2013.01); *H02G 1/1202* (2013.01); *H02G 1/14* (2013.01); *H02G 3/22* (2013.01)

(58) Field of Classification Search
CPC ...... H02G 3/0616; H02G 3/22; H02G 3/0675; H02G 1/005; H02G 1/1202; H02G 1/14
See application file for complete search history.

(56) References Cited

U.S. PATENT DOCUMENTS

| | | | | |
|---|---|---|---|---|
| 1,222,806 | A * | 4/1917 | Schmitt .................. | F16L 41/14 285/206 |
| 3,639,677 | A * | 2/1972 | Bain ....................... | H02G 3/06 285/80 |
| 3,885,821 | A * | 5/1975 | Philibert ................ | F16L 27/12 285/302 |
| 3,951,436 | A * | 4/1976 | Hyde, Jr. ................ | F16L 25/10 285/27 |
| 4,091,523 | A * | 5/1978 | Riecke ................... | H01R 4/60 285/404 |
| 6,715,803 | B1 * | 4/2004 | Pahl ....................... | F16L 25/08 285/302 |
| 7,078,623 | B1 * | 7/2006 | Sheehan .............. | H02G 3/0616 174/152 G |

(Continued)

*Primary Examiner* — Bayan Salone
(74) *Attorney, Agent, or Firm* — Wood, Phillips, Katz, Clark & Mortimer

(57) ABSTRACT

A conduit coupling assembly facilitates connection of liquid-tight tubing with a conduit section through which associated electrical wiring and/or cables are routed. The assembly includes a transition coupling, which is joined to male and female, liquid-tight connectors. The coupling assembly is joined to the conduit and projects above an associated concrete slab or the like to position the liquid-tight connectors for efficiently joining associated liquid-tight tubing to the conduit. The conduit coupling assembly thus particularly facilitates routing of wiring from a conduit section positioned within a concrete slab or like flooring element, through the transition coupling, and the liquid-tight connectors.

9 Claims, 1 Drawing Sheet

(56) References Cited

U.S. PATENT DOCUMENTS

| | | | |
|---|---|---|---|
| 7,631,902 B2 * | 12/2009 | Vrame | H02G 3/383 |
| | | | 52/220.8 |
| 8,001,737 B1 | 8/2011 | Price | |
| 10,473,253 B2 * | 11/2019 | Vrame | F16L 41/002 |
| 11,047,143 B2 * | 6/2021 | Dingler | E04G 17/0655 |
| 2017/0211739 A1 * | 7/2017 | Vrame | F16L 41/002 |

* cited by examiner

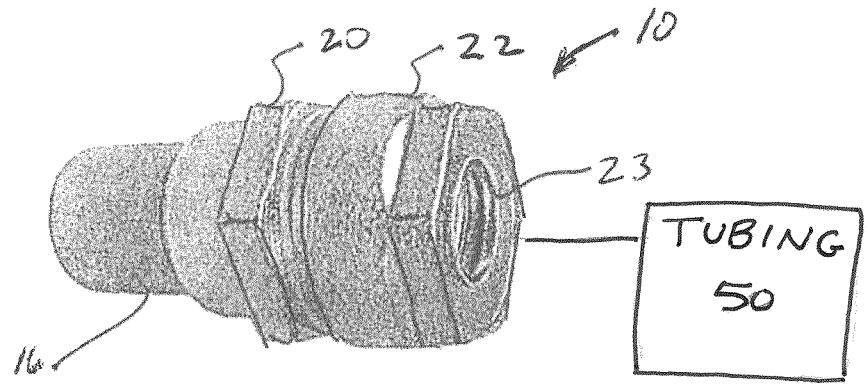
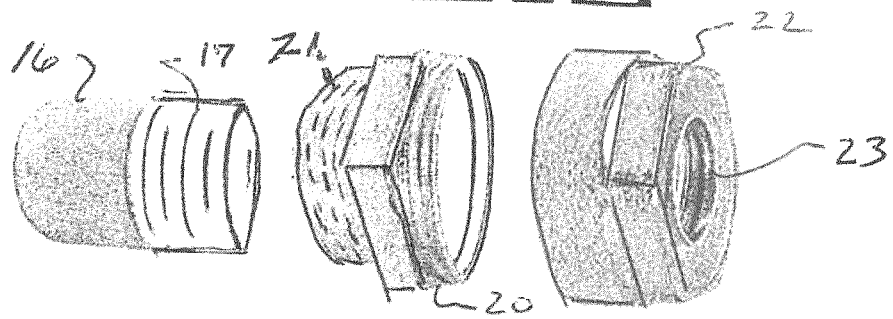
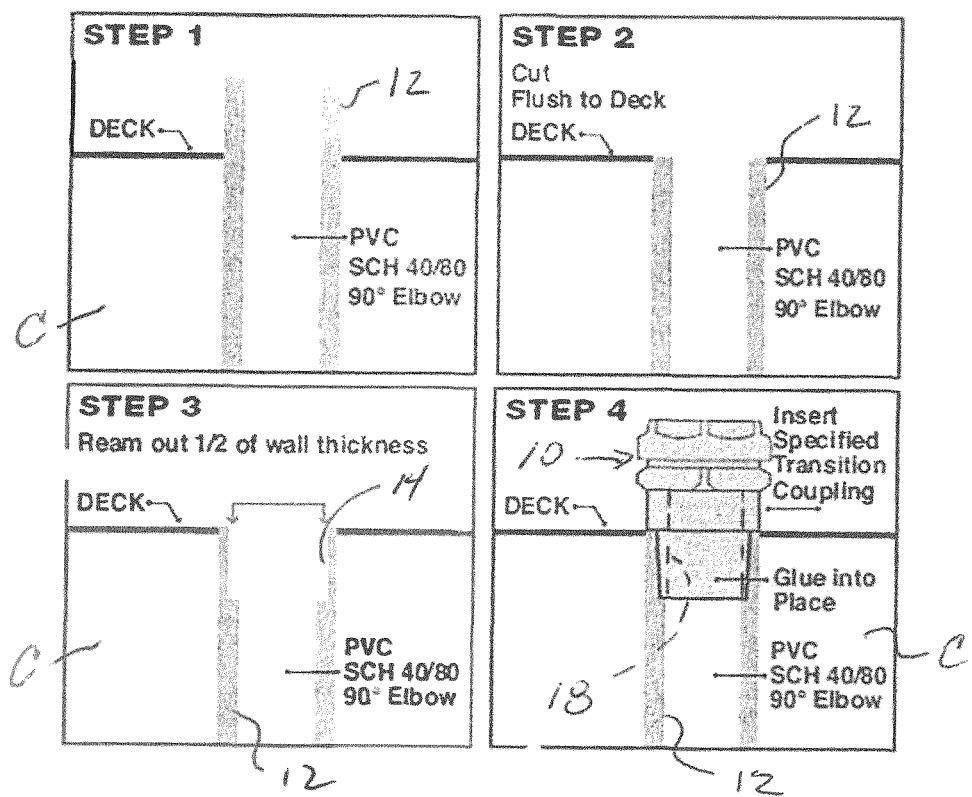

US 11,876,360 B2

CONDUIT COUPLING ASSEMBLY

FIELD OF THE INVENTION

The present invention relates generally to assembly of conduits, tubing, and like components in a building or other structure, and more particularly to a conduit coupling assembly which facilitates joining liquid-tight connectors to a conduit positioned in a concrete slab or similar environment. The present coupling assembly facilitates attachment of polyvinyl chloride (PVC) conduit material to an associated, composite liquid-tight conduit having a metallic core and a polymeric protective coating.

BACKGROUND OF THE INVENTION

Electrical conduit and related accessories may be made from a variety of materials such as PVC, thin wall metal, heavy wall metal, flexible tubing (MC cable and other types of flexible cable), as well as other materials known to those skilled in the art. For some applications, composite conduit assemblies, such as comprising a metallic core and a polymeric protective coating, are required. Often-times, these materials are used in combination and therefore, adapters and couplings must be used to join the materials. Couplings are generally used to connect tubing, such as electrical conduit to various other forms of electrical tubing and support structures. In some applications, electrical conduit can be arranged to extend at least partially within a floor structure, such as a concrete slab.

In the course of a typical installation, it may be necessary for electrical workers to provide conduit components which extend from within a concrete slab or like floor element for connection with other components positioned about the concrete slab. Bearing in mind that electrical wiring positioned within the conduit components must be threaded and directed through the various components, it is desirable to provide an arrangement which facilitates assembly of the components, while promoting efficient routing of the associated wiring.

The present invention is directed to conduit coupling assembly which facilitates assembly of liquid-tight connectors, and associated tubular structures, with conduit components typically used in conjunction with electrical wiring, with the present invention particularly suited for applications in which conduit components are positioned in a concrete slab or like flooring structure.

SUMMARY OF THE INVENTION

The present invention is directed to a conduit coupling assembly and method of installation which particularly facilitates efficient connection of liquid-tight connectors and associated tubing to conduit components, typically polyvinyl chloride, positioned in a concrete slab or like structure. The assembly can be used in wet environments, such as in the area of cooling towers in data centers. The arrangement eliminates rigid nipples, by directly connecting PVC conduit to a liquid-tight flex conduit on equipment, generators, transformer gear, switch gear, ATS switches, and the like. Connection from concrete pads to various heating, ventilation and air conditioning equipment is facilitated.

In accordance with the present invention, the present method of forming a coupling assembly comprises the steps of providing a conduit, typically formed from polyvinyl chloride (PVC) in an associated building slab, or like structure, so that the conduit projects from the surface of the slab. The method includes cutting a portion of the conduit which projects above the surface of the slab to prepare the conduit for connection.

The present method further contemplates cutting the conduit at an inside surface thereof to form a connection region, which is preferably tapered. This step is preferably effected by reaming the interior surface of the conduit to provide an inner surface for assembling the components of the assembly.

Next, a transition coupling is provided, with the transition coupling inserted into the conduit in the tapered, connection region of the conduit. Industrial grade adhesive is provided to securely and permanently adhere the transition coupling to the conduit.

The present method next includes providing cooperating, liquid-tight male and female connectors. These types of connectors are ordinarily used in applications where resistance to the ingress of water, moisture, or other liquid or fluids is mandated. As noted, such applications can include cooling towers, transformers, switch gear, and like environments and applications where waterproof connections are required.

The assembly is completed by joining one of liquid-tight connectors to transition coupling, to thereby facilitate joining the other of liquid-tight connectors to the conduit in the associated slab. To this end, the transition coupling is preferably provided with a male thread formation on an exterior surface therefore for threaded engagement with a female thread formation provided at an interior surface of the connector joined to the transition coupling. Adhesive applied to the thread formations secures them to each other. The light-tight connectors can be threaded or unthreaded as may be required for joining associated tubing or the like to the conduit positioned in the associated slab.

Other features and advantages will become readily apparent from the following detailed description, the accompanying drawings, and the appended claims.

BRIEF DESCRIPTION OF THE DRAWINGS

FIG. 1 is a diagrammatic, perspective view of the present conduit coupling assembly, which can be joined to a conduit in an associated concrete slab, as typical in a structure for which the present invention is suited for use;

FIG. 2 is an exploded, diagrammatic view further illustrating components of the present conduit coupling assembly; and FIG. 3 illustrates the steps performed in accordance with the present invention for joining a liquid-tight connector to the conduit.

DETAILED DESCRIPTION

While the present invention is susceptible of embodiment in various forms, there is shown in the drawings and will hereinafter be described a presently preferred embodiment, with the understanding that the present disclosure is intended as exemplification of the invention, and is not intended to limit the invention to the specific embodiment This invention pertains to couplings and adapters for conduits and tubular members, and in more particularly to an arrangement including a conduit coupling assembly configured to facilitate connection of liquid-tight tubing to an associated conduit section, wherein the conduit section is disposed in an associated floor or concrete slab. Associated electrical wiring or the like can be arranged to extend from within the conduit in the concrete slab, and through the coupling assembly and the associated liquid-tight tubing.

With reference to the illustrated embodiment, the present invention is directed to a conduit coupling assembly, designated 10, and a method of installation which particularly facilitates efficient connection of liquid-tight connectors and associated tubing to conduit components, typically polyvinyl chloride (PVC), positioned in a concrete slab C or like structure. The assembly 10 can be used in wet environments, such as in the area of cooling towers in date centers. The arrangement eliminates rigid nipples, by directly connecting PVC conduit to a liquid-tight flex conduit on equipment, generators, transformer gear, switch gear, ATS switches, and the like. Connection from concrete pads to various heating, ventilation and air conditioning equipment is facilitated.

In accordance with the present invention, and as diagrammatically illustrated in FIG. 3, the present method of forming a coupling assembly comprises the steps of providing a conduit 12, typically formed from polyvinyl chloride (PVC) in the associated building slab C or like structure so that the conduit projects 12 from the surface of the slab. This is illustrated in Step 1 of FIG. 3.

As illustrated in Step 2 of FIG. 3, the present method includes cutting a portion of the conduit 12 which projects above the surface of the slab C to prepare the conduit for connection.

With reference now to Step 3 as illustrated in FIG. 3, the present method next contemplates cutting the conduit 12 at an inside surface thereof to form a connection region 14, which is preferably tapered inwardly in a direction away from the conduit opening, ie, downwardly and innwardly in the illustrated embodiment. This step is preferably effected by reaming the interior surface of the conduit 12 to provide an inner surface at 14 for assembling the components of the present assembly.

Next, a transition coupling 16, configured in accordance with the present invention, is provided, with the transition coupling 16 inserted into the conduit 12 in the tapered, connection region 14 of the conduit. The transition coupling 16 is preferably formed from PVC for economical and durable service. The exterior of the transition coupling is provided with a tapered surface which is complementary to the tapered, connection region 14 of the conduit 12. Industrial grade adhesive is provided to securely and permanently adhere the transition coupling to the conduit. Step 4 illustrated in FIG. 3 shows this step of the process, with the conduit coupling assembly 10 illustrated joined to the conduit 12. As illustrated, the inside diameter of the transition coupling 16, as shown in phantom line at 18, is the same as the inside diameter of conduit 12 to facilitate the smooth passage of wiring through the assembled components.

As shown, the present method includes providing cooperating, liquid-tight male and female connectors, 20, 22. These types of connectors are ordinarily used in applications where resistance to the ingress of water, moisture, or other liquid or fluids is mandated. As noted, such applications can include cooling towers, transformers, switch gear, and like environments and applications where waterproof connections are required. A ferrule 23 is positioned and held in captive relationship between the connectors 20, 22. This ferrule is joined to associated liquid-tight tubing 50 attendant to assembly of the components.

The present coupling assembly is completed by joining one of liquid-tight connectors 20, 22, to the transition coupling 16, to thereby facilitate joining the other of liquid-tight connectors to the conduit in the associated slab. In the illustrated embodiment, the male liquid-tight connector 20 is joined to the transition coupling 15. To this end, the transition coupling 16 is preferably provided with a male thread formation 17 on an exterior surface thereof (FIG. 2) for threaded engagement with an internal, female thread formation, shown in phantom line at 21, provided at an interior surface of the connector 20 joined to the transition coupling 16. Adhesive applied to the thread formations 17, 21 secures them to each other. The liquid-tight connectors 20, 22 can be threaded or unthreaded as may be required for joining associated tubing or the like to the conduit positioned in the associated slab.

As will be appreciated from the above description, the exact order in which components of the present assembly are joined to each other and assembled can be varied in accordance with the requirements of any specific application.

From the foregoing, it will be observed that numerous modifications and variations of the present invention can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

What is claimed is:

1. A method of forming a coupling assembly between a conduit and tubing, comprising the steps of:

providing said conduit in an associated building slab so that said conduit projects from the surface of the slab;

cutting a portion of said conduit which projects above the surface of the slab;

cutting said conduit at an inside surface thereof to form a connection region;

providing a transition coupling;

inserting said transition coupling into said connection region of said conduit, and securing said inserted transition coupling to said conduit;

providing cooperating male and female connectors, and joining one of said male and female connectors to said secured transition coupling, and joining the other of the male and female connectors to the one of the male and female connectors so as to thereby join the tubing to the conduit in the slab and create a liquid-tight connection between the conduit and tubing.

2. A method of forming a coupling assembly in accordance with claim 1, including cutting said conduit at the inside surface thereof by reaming said conduit.

3. A method of forming a coupling assembly in accordance with claim 1, including cutting said conduit at the inside surface thereof at a taper.

4. A method of forming a coupling assembly in accordance with claim 1, including joining said male connector to said transition coupling.

5. A method of forming a coupling assembly in accordance with claim 4, including providing a male thread formation on an exterior surface of said transition coupling, and providing a female thread formation on an interior surface of said male connector, and engaging said male and female thread formations for joining said male connector to said transition coupling.

6. A method of forming a coupling assembly in accordance with claim 5, including providing an adhesive for adhering said male and female thread formations to each other.

7. A method of forming a coupling assembly in accordance with claim 1, wherein said transition coupling comprises polyvinyl chloride.

8. The method of forming a coupling assembly in accordance with claim 1 further comprising the step of providing a ferrule and the step of joining the other of the male and female connectors to the one of the male and female connectors comprises causing the ferrule to be captive between the male and female connectors to produce the liquid-tight connection.

9. The method of forming a coupling assembly in accordance with claim 8 wherein the male and female connectors threadably engage each other.

\* \* \* \* \*